US012632265B2

(12) United States Patent
Sayyed et al.

(10) Patent No.: US 12,632,265 B2
(45) Date of Patent: May 19, 2026

(54) SMART SEARCH OF BASIC INPUT/OUTPUT SYSTEM (BIOS) SETTINGS

(71) Applicant: Dell Products L.P., Round Rock, TX (US)

(72) Inventors: Ibrahim Sayyed, Georgetown, TX (US); Amit K. Tiwari, Austin, TX (US); Adolfo S. Montero, Pflugerville, TX (US); Anand Prakash Joshi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/746,340

(22) Filed: Jun. 18, 2024

(65) Prior Publication Data

US 2025/0383883 A1     Dec. 18, 2025

(51) Int. Cl.
*G06F 9/4401*     (2018.01)
*G06F 40/20*     (2020.01)

(52) U.S. Cl.
CPC ............ *G06F 9/4401* (2013.01); *G06F 40/20* (2020.01)

(58) Field of Classification Search
None
See application file for complete search history.

(56) References Cited

U.S. PATENT DOCUMENTS

| | | | |
|---|---|---|---|
| 2014/0269306 A1* | 9/2014 | Alsup .................... | H04L 47/13 370/235 |
| 2020/0327178 A1* | 10/2020 | Vaananen .............. | G06N 5/013 |
| 2021/0089325 A1* | 3/2021 | Suryanarayana ....... | G06F 9/455 |
| 2021/0349844 A1* | 11/2021 | Schaefer ............. | G06F 13/4282 |
| 2021/0373910 A1* | 12/2021 | Suryanarayana ... | H04L 63/0428 |

* cited by examiner

*Primary Examiner* — Paul Yen
(74) *Attorney, Agent, or Firm* — Fogarty LLP

(57) ABSTRACT

Systems and methods for smart search of Basic Input/Output System (BIOS) settings. An Information Handling System (IHS) includes a processor and a memory coupled to the processor. The memory stores program instructions that, upon execution, cause the IHS to receive a Natural Language (NL) input from a user via a search field on a BIOS setup page in a pre-boot environment. The system processes the NL input through an Artificial Intelligence (AI) model configured to identify one or more BIOS settings relevant to the NL input. The identified BIOS settings are made available to the user as part of a search result, which may include one or more hyperlinks retrieved from a catalog of hyperlinks created based on an Internal Form Representation (IFR) binary file.

14 Claims, 5 Drawing Sheets

START 401

RECEIVE NATURAL LANGUAGE INPUT 402

CONVERT NATURAL LANGUAGE INPUT INTO TOKENS 403

TRANSLATE TOKENS INTO BIOS SETTINGS 404

PRODUCE SEARCH RESULT 405

REFINE SEARCH RESULT 406

VISUALLY HIGHLIGHT UI ELEMENT IN SUBSEQUENT SETUP PAGE 407

END 408

400

200

400

500

SMART SEARCH OF BASIC INPUT/OUTPUT SYSTEM (BIOS) SETTINGS

FIELD

This disclosure relates generally to Information Handling Systems (IHSs), and more specifically, to systems and methods for smart search of Basic Input/Output System (BIOS) settings.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for smart search of Basic Input/Output System (BIOS) settings. In an illustrative, non-limiting embodiment, an Information Handling System (IHS) may include a processor and a memory coupled to the processor, the memory having program instructions stored thereon that, upon execution, cause the IHS to receive a Natural Language (NL) input from a user via a search field on a Basic Input/Output System (BIOS) setup page in a pre-boot environment; and process the NL input through an Artificial Intelligence (AI) model configured to identify one or more BIOS settings relevant to the NL input.

According to another implementation, the AI model may include a front-end configured to turn the NL input into tokens.

According to yet another embodiment, the AI model may include a transformer coupled to the front-end, the transformer configured to translate the tokens into the identified BIOS settings.

According to another implementation, the NL input may involve two or more IHS components, and the identified BIOS settings may relate to each of the two or more IHS components.

According to yet another embodiment, the program instructions, upon execution, may cause the IHS to make the identified BIOS settings available to the user as part of a search result.

According to another implementation, the program instructions, upon execution, may cause the IHS to present the search result in an order from most to least searched BIOS settings.

According to yet another embodiment, the search result may include one or more hyperlinks.

According to another implementation, the program instructions, upon execution, may cause the IHS to retrieve one or more of the hyperlinks from a catalog of hyperlinks created based, at least in part, upon an Internal Form Representation (IFR) binary file.

According to yet another embodiment, each entry in the catalog of hyperlinks may include: a Human Interface Infrastructure (HII) handle, a Formsetguid, a FormID, a QuestionID, and a title string.

According to another implementation, the program instructions, upon execution, may cause the IHS to visually distinguish a User Interface (UI) element on another setup page produced in response to the user selecting a hyperlink based, at least in part, upon the catalog of hyperlinks.

In another illustrative, non-limiting embodiment, a method may include receiving an NL input from a user on a BIOS setup page in a pre-boot environment; processing the NL input through an AI model configured to identify one or more BIOS settings relevant to the NL input; and making the identified BIOS settings available to the user as part of a search result.

According to another implementation, the NL input may include a text input.

According to yet another embodiment, the NL input may include an audio input.

According to another implementation, the method further may include making the identified BIOS settings available to the user in the search results as one or more hyperlinks.

According to yet another embodiment, a hardware memory device may have program instructions stored thereon that, upon execution by a processor of an IHS, cause the IHS to receive an NL input from a user via a search field on a BIOS setup page in a pre-boot environment; process the NL input through an AI model configured to identify one or more BIOS settings relevant to the NL input; and make the identified BIOS settings available to the user as part of a search result.

According to another implementation, the search result may include one or more hyperlinks.

According to yet another embodiment, the program instructions, upon execution, may cause the IHS to retrieve one or more of the hyperlinks from a catalog of hyperlinks created based, at least in part, upon an Internal Form Representation (IFR) binary file.

According to another implementation, the processor may be part of a heterogenous computing platform selected from the group consisting of: a System-On-Chip (SoC), a Field-Programmable Gate Array (FPGA), and an Application-Specific Integrated Circuit (ASIC).

According to yet another embodiment, the heterogenous computing platform may include a Reduced Instruction Set Computer (RISC) processor coupled to the Embedded Controller (EC) via an interconnect.

According to another implementation, the interconnect may include at least one of: an Advanced Microcontroller Bus Architecture (AMBA) bus, a QuickPath Interconnect (QPI) bus, or a HyperTransport (HT) bus.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various Input/Output (I/O) devices, such as a keyboard, a mouse, touchscreen, and/or a video display. An IHS may also include one or more buses operable to transmit communications between the various hardware components.

The terms "heterogenous computing platform," "heterogenous processor," or "heterogenous platform," as used herein, refer to an Integrated Circuit (IC) or chip (e.g., a System-On-Chip or "SoC," a Field-Programmable Gate Array or "FPGA," an Application-Specific Integrated Circuit or "ASIC," etc.) containing a plurality of discrete processing circuits or semiconductor Intellectual Property (IP) cores (collectively referred to as "SoC devices" or simply "devices") in a single electronic or semiconductor package, where each device has different processing capabilities suitable for handling a specific type of computational task. Examples of heterogenous processors include, but are not limited to: QUALCOMM's SNAPDRAGON, SAMSUNG's EXYNOS, APPLE's "A" SERIES, etc., which typically include ARM core(s).

The term "hardware-based security architecture," as used herein, refers to security technologies that provide hardware isolation for secure code execution within a heterogenous computing platform and/or IHS. A hardware-based security architecture implements its security features and/or enclaves at the hardware level, built directly into the processor and other hardware components of the IHS, thus providing robust security capabilities that are less vulnerable to attacks. Examples of hardware-based security architectures include, but are not limited to: ARM's TRUSTZONE, APPLE's T2 SECURITY CHIP, GOOGLE'S TITAN SECURITY CHIPS, etc. Each architecture may execute its own Operating System (OS) distinct from any host OS or service OS of the IHS.

Figure 1:
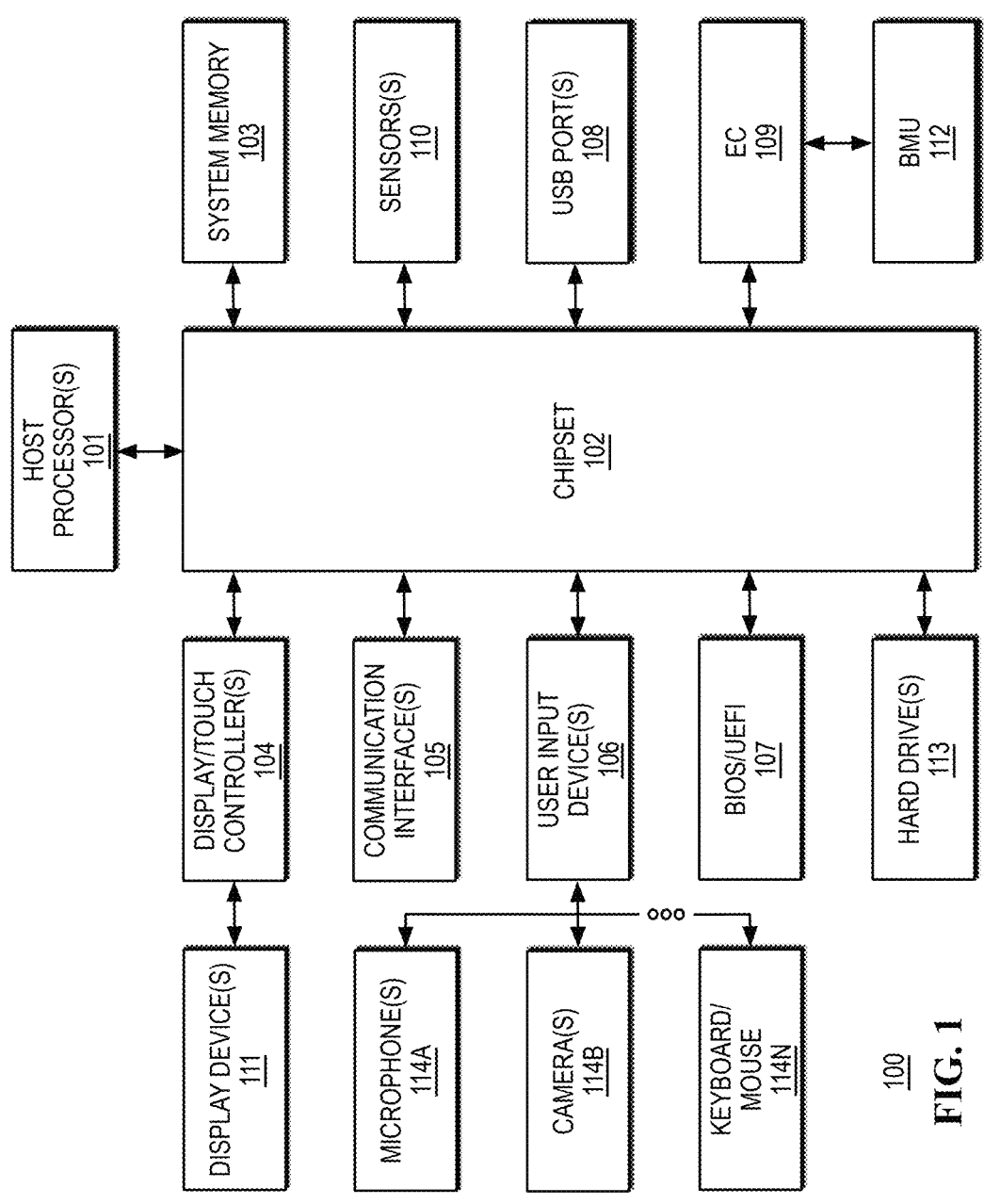
FIG. 1 is a diagram illustrating examples of components of an Information Handling System (IHS), according to some embodiments.

FIG. 1 is a block diagram of examples of components of IHS 100, according to some embodiments. As shown, IHS 100 includes host processor(s) 101. In various embodiments, IHS 100 may be a single-processor system, or a multi-processor system including two or more processors. Host processor(s) 101 may include any processor capable of executing program instructions, such as an INTEL/AMD x86 processor, or any general-purpose or embedded processor implementing any of a variety of Instruction Set Architectures (ISAs), such as a Complex Instruction Set Computer (CISC) ISA, a Reduced Instruction Set Computer (RISC) ISA (e.g., one or more ARM core(s), or the like).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101. Chipset 102 may also be coupled to communication interface(s) 105 to enable communications between IHS 100 and various wired and/or wireless networks, such as ETHERNET, WIFI, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like.

Communication interface(s) 105 may be used to communicate with peripherals devices (e.g., BT speakers, headsets, etc.). Moreover, communication interface(s) 105 may be coupled to chipset 102 via a Peripheral Component Interconnect Express (PCIe) bus, or the like. Chipset 102 may be coupled to display and/or touchscreen controller(s) 104, which may include one or more Graphics Processor Units (GPUs) on a graphics bus, such as an Accelerated Graphics Port (AGP) or PCIe bus. As shown, display controller(s) 104 may provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may operate as a single continuous display, rather than two discrete displays.

Chipset 102 may provide host processor(s) 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a Solid-State Drive (SSD), Non-Volatile Memory Express (NVMe), or the like.

In certain embodiments, chipset 102 may also provide host processor(s) 101 with access to one or more USB ports 108, to which one or more peripheral devices may be coupled (e.g., integrated or external webcams, microphones, speakers, etc.). Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.).

In certain embodiments, chipset 102 may further provide an interface for communications with one or more hardware sensors 110. Sensor(s) 110 may be disposed on or within the chassis of IHS 100, or otherwise coupled to IHS 100, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), accelerometer, etc.

Basic Input/Output System (BIOS)/Unified Extensible Firmware Interface (UEFI) 107 is coupled to chipset 102. In some situations, the terms "BIOS" and "UEFI" may be used interchangeably. In operation, BIOS/UEFI 107 provides an abstraction layer that allows a host OS to interface with certain hardware components utilized by IHS 100.

When IHS 100 is powered on, host processor(s) 101 may utilize program instructions of BIOS/UEFI 107 to initialize and test hardware components coupled to IHS 100, and to load host OS 312 for use by IHS 100. As used herein, the term "pre-boot" refers to the period of time, processes, and/or environment between the initialization of host processor(s) 101 and its taking over by host OS 312, after host OS 312 is loaded and operational.

Through a hardware abstraction layer provided by BIOS/UEFI 107, software stored in system memory 103 and executed by host processor(s) 101 may interface with certain I/O devices that are coupled to IHS 100.

EC 109 (sometimes referred to as a Baseboard Management Controller or "BMC") includes a microcontroller unit or processing core dedicated to handling selected IHS operations not ordinarily handled by host processor(s) 101. Examples of such operations may include, but are not limited to: power sequencing, power management, receiving and processing signals from a keyboard or touchpad, as well as operating chassis buttons and/or switches (e.g., power button, laptop lid switch, etc.), receiving and processing thermal measurements (e.g., performing cooling fan control, CPU and GPU throttling, and emergency shutdown), controlling indicator Light-Emitting Diodes or "LEDs" (e.g., caps lock, scroll lock, num lock, battery, ac, power, wireless LAN, sleep, etc.), managing a battery charger and a battery, enabling remote management, diagnostic tests (or "diagnostics"), remediation over an OOB or sideband network, etc.

Unlike other devices in IHS 100, EC 109 may be operational from the time IHS 100 is first powered on, before other devices are fully running or even powered. As such, EC 109 firmware may be responsible for interfacing with a power adapter to manage the various power states that may be supported by IHS 100. Power operations of EC 109 may also provide other components of the IHS 100 with power status information for the IHS, such as whether IHS 100 is operating from battery power or is plugged into an AC power source. Firmware instructions utilized by EC 109 may be used to manage other core operations of IHS 100 (e.g., turbo modes, maximum operating clock frequencies of certain components, etc.).

From the perspective of users, IHS 100 may appear to be either "on" or "off," without any other detectable power states. In some embodiments, however, an IHS 100 may support multiple power states that may correspond to the states defined in the Advanced Configuration and Power Interface (ACPI) specification, such as: S0, S1, S2, S3, S4, S5, and G3.

EC 109 may implement operations for detecting certain changes to the physical configuration or posture of IHS 100 (such as a laptop computer). For instance, when IHS 100 as a 2-in-1 laptop/tablet form factor, EC 109 may receive inputs from a lid position or hinge angle sensor 110, and may use those inputs to determine: whether the two sides of IHS 100 have been latched together to a closed position or a tablet position, the magnitude of a hinge or lid angle, etc. In response to these changes, EC 109 may enable or disable certain features of IHS 100 (e.g., front or rear facing camera, etc.).

In this manner, EC 109 may identify any number of IHS physical postures, including, but not limited to: laptop, stand, tablet, or book. For example, when an integrated display 111 of IHS 100 is open with respect to a horizontal, face-up position of an integrated keyboard, EC 109 may determine IHS 100 to be in a laptop posture. When an integrated display 111 of IHS 100 is open with respect to a horizontal keyboard portion, but the keyboard is facing down (e.g., its keys are against the top surface of a table), EC 109 may determine IHS 100 to be in a kickstand posture. When the back of an integrated display 111 is closed against the back of the keyboard portion of an IHS, EC 109 may determine IHS 100 to be folded in a tablet posture. When IHS 100 has two integrated displays 111 that are open side-by-side (e.g., in a hybrid laptop with displays in both panels), EC 109 may determine an IHS 100 to be in a book posture. When an IHS 100 is determined to be in a book posture, EC 109 may also determine if the display(s) 111 of IHS 100 are arranged in a landscape or portrait orientation, relative to the user.

In some implementations, EC 109 may be installed as part of a Trusted Execution Environment (TEE) component to the motherboard of IHS 100. As a component with hardware root-of-trust (RoT), EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC 109 may later recalculate a hash value based on instructions and settings loaded for use by a hardware component of IHS 100 and may compare the calculated value against the reference hash value to determine if any modifications have been made to the component, thus indicating that the component has been compromised. As such, EC 109 may validate the integrity of hardware and software components installed in IHS 100.

In some embodiments, EC 109 may provide an OOB (Out-Of-Band) or sideband channel that allows an Information Technology Decision Maker (ITDM) or Original Equipment Manufacturer (OEM) to manage various settings and configurations of an IHS 100. OOB is used in contradistinction with "in-band" communication channels that operate only after networking 105 other interfaces of the IHS have been initialized, and the OS of the IHS has been successfully booted.

In various embodiments, IHS 100 may be coupled to an external power source through an AC adapter, power brick, or the like. The AC adapter may be removably coupled to a battery charge controller to provide IHS 100 with a source of DC power provided by battery cells of a battery system in the form of a battery pack (e.g., a lithium ion or "Li-ion" battery pack, or a nickel metal hydride or "NiMH" battery pack including one or more rechargeable batteries). Battery Management Unit (BMU) 112 may be coupled to EC 109 and it may include, for example, an Analog Front End (AFE), storage (e.g., non-volatile memory), and a micro-controller. In some cases, BMU 112 may be configured to collect and store information, and to provide that informa-tion to EC 109.

Examples of information collectible by BMU 112 may include, but are not limited to: operating conditions (e.g., battery operating conditions including battery state informa-tion such as battery current amplitude and/or current direc-tion, battery voltage, battery charge cycles, battery state of charge, battery state of health, battery temperature, battery usage data such as charging and discharging data; and/or IHS operating conditions such as processor operating speed data, system power management and cooling system set-tings, state of "system present" pin signal), environmental or context information (e.g., such as ambient temperature, relative humidity, system geolocation measured by GPS or triangulation, time and date, etc.), etc.

In various embodiments, EC 109 may be coupled (e.g., via a GPIO pin) to any of a plurality of IHS components including, but not limited to: a fan, a cable, a battery, a temperature sensor, or a display. Moreover, EC 109 may be configured to perform or trigger the performance of any number of diagnostic operations for any of these compo-nents. For example, in some cases EC 109 may be config-ured to request that display 111 perform a Built-In-Self-Test (BIST) and to return BIST results to EC 109 upon comple-tion. In other cases, however, EC 109 may itself run the diagnostic operation.

In some embodiments, IHS 100 may not include all components shown in FIG. 1. In other embodiments, IHS 100 may include other components in addition to those shown in FIG. 1. Furthermore, some components illustrated as separate components in FIG. 1 may instead be integrated with other components, such that all or a portion of the operations executed by the illustrated components may instead be executed by the integrated component.

For instance, in various embodiments, host processor(s) 101 and/or other components shown in FIG. 1 (e.g., chipset 102, display controller(s) 104, communication interface(s) 105, EC 109, etc.) may be replaced by devices within a heterogenous computing platform. As such, IHS 100 may assume different form factors including, but not limited to: servers, workstations, desktops, laptops, appliances, video game consoles, tablets, smartphones, etc.

Historically, IHSs with desktop and laptop form factors have had conventional host OSs executed on INTEL or AMD's "x86"-type processors. Other types of processors, such as ARM processors, have been used in smartphones and tablet devices, which typically run thinner, simpler, and/or mobile OSs (e.g., ANDROID, iOS, WINDOWS MOBILE, etc.). More recently, however, IHS manufacturers have started producing fully-fledged desktop and laptop IHSs equipped with ARM-based, heterogenous computing platforms. Accordingly, host OSs (e.g., WINDOWS on ARM) have been developed to provide users with a familiar OS experience on those platforms.

Figure 2:
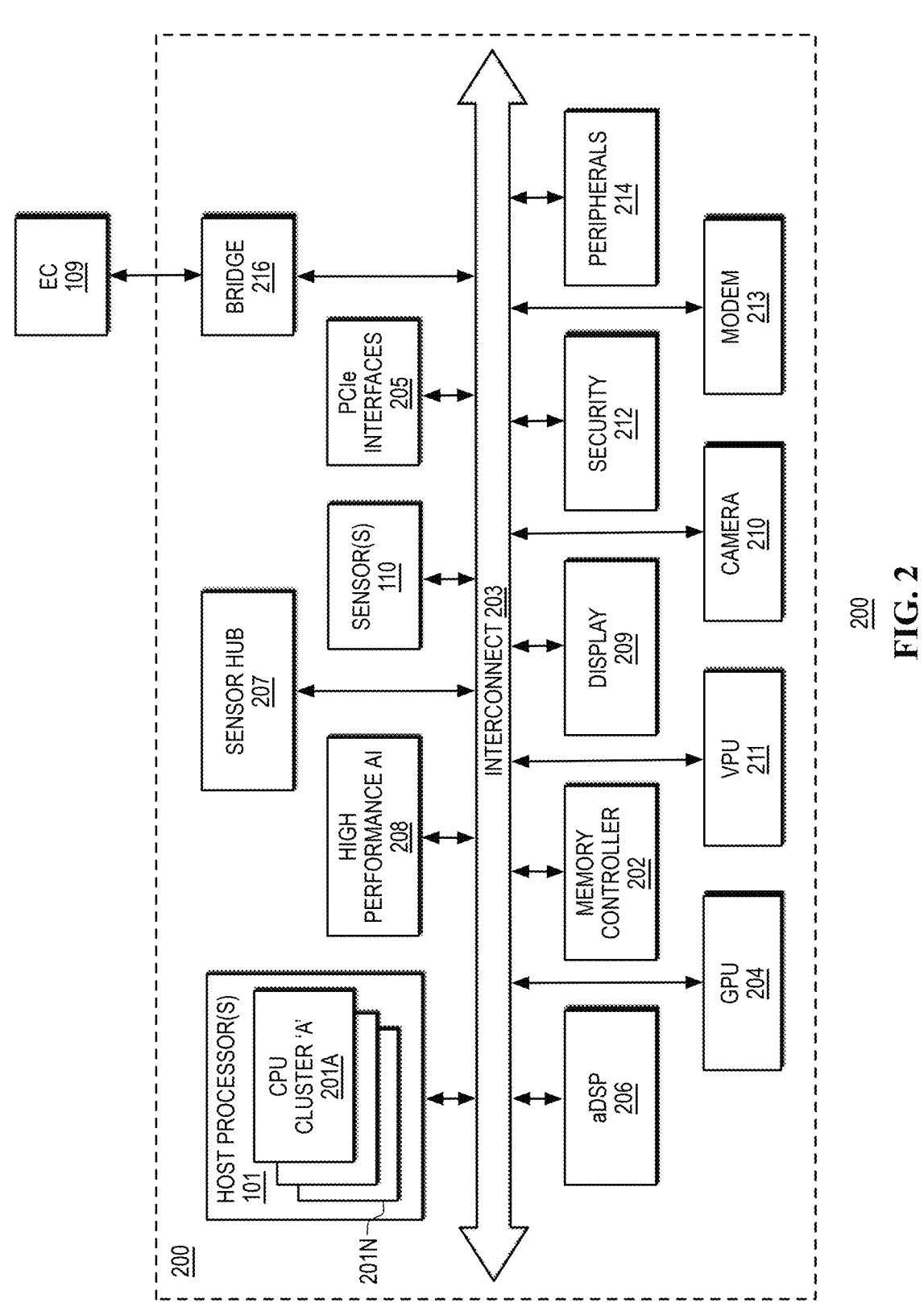
FIG. 2 is a diagram illustrating an example of a heterogenous computing platform configured to implement one or more aspects of an IHSs, according to some embodiments.

FIG. 2 is a diagram illustrating an example of heterog-enous computing platform 200 which may be implemented as part of IHS 100 and/or it may replace certain components shown in FIG. 1 (e.g., host processor(s) 101)). In various embodiments, heterogenous computing platform 200 may be implemented as one or more SoCs, FPGAs, ASICs, or the like.

Heterogenous computing platform 200 may include one or more discrete and/or segregated devices or components, each having a different set of processing capabilities suitable for handling a particular type of computational task. When each device in platform 200 is tasked with executing only the types of computational tasks that it is specifically designed to execute, the overall power consumption of heterogenous computing platform 200 is reduced.

In various implementations, some of the devices in het-erogenous computing platform 200 may include their own microcontroller(s) or core(s) (e.g., ARM core(s)) and cor-responding firmware. In some cases, a device in platform 200 may also include its own hardware-embedded accelera-tor (e.g., a secondary or co-processing core coupled to a main core). Each device in heterogenous computing plat-form 200 may be accessible through a respective Applica-tion Programming Interface (API). Additionally, or alterna-tively, some devices in heterogenous computing platform 200 may execute their own OS. Additionally, or alterna-tively, one or more of the devices of heterogenous comput-ing platform 200 may be virtual devices.

In the embodiment illustrated in FIG. 2, heterogenous computing platform 200 includes CPU clusters 201A-N that may correspond to system processor(s) 101, and that are intended to perform general-purpose computing operations. Each of CPU clusters 201A-N may include one or more processing cores and cache memories. In operation, CPU clusters 201A-N are available and accessible to the IHS's host OS 312 (e.g., WINDOWS on ARM) and other appli-cations executed by IHS 100.

CPU clusters 201A-N may be coupled to memory con-troller 202 via internal interconnect fabric 203. Memory controller 202 may be responsible for managing system memory access for all of devices connected to internal interconnect fabric 203, which may include any communi-cation bus suitable for inter-device communications within an SoC (e.g., Advanced Microcontroller Bus Architecture or "AMBA," QuickPath Interconnect or "QPI," HyperTrans-port or "HT," etc.).

Devices coupled to internal interconnect fabric 203 may communicate with each other and with a host OS executed by CPU clusters 201A-N. In some cases, devices 209-211 may be coupled to internal interconnect fabric 203 via a secondary interconnect fabric (not shown). A secondary interconnect fabric may include any bus suitable for inter-device and/or inter-bus communications within an SoC.

GPU 204 produces graphical or visual content and com-municates that content to a monitor or display of IHS 100 for rendering. In some embodiments, display engine or control-ler 209 may be designed to perform additional video enhancement operations. In operation, display engine 209 may implement procedures for providing the output of GPU 204 as a video signal to one or more external displays coupled to IHS 100 (e.g., display device(s) 111). PCIe interfaces 205 provide an entry point into any additional devices external to heterogenous computing platform 200 that have a respective PCIe interface (e.g., graphics cards, USB controllers, etc.).

Audio Digital Signal Processor (aDSP) 206 is a device designed to perform audio and speech operations and to perform in-line enhancements for audio input(s) and output(s). Examples of audio and speech operations include, but are not limited to: noise reduction, echo cancellation, directional audio detection, wake word detection, muting and volume controls, filters and effects, etc. In operation, input and/or output audio streams may pass through and be processed by aDSP 206, which can send the processed audio to other devices on internal interconnect fabric 203 (e.g., CPU clusters 201A-N).

In some embodiments, aDSP 206 may be configured to process one or more of heterogenous computing platform 200's sensor signals (e.g., gyroscope, accelerometer, pressure, temperature, etc.), low-power vision or camera streams (e.g., for user presence detection, onlooker detection, etc.), or battery data (e.g., to calculate a charge or discharge rate, current charge level, etc.).

Camera device 210 includes an Image Signal Processor (ISP) configured to receive and process video frames captured by a camera coupled to heterogenous computing platform 200 (e.g., in the visible and/or infrared spectrum). Video Processing Unit (VPU) 211 is a device designed to perform hardware video encoding and decoding operations, thus accelerating the operation of camera 210 and display/graphics device 209. VPU 211 may be configured to provide optimized communications with camera device 210 for performance improvements.

Sensor hub 207 may include AI capabilities designed to consolidate information received from other devices in heterogenous computing platform 200, process context and/or telemetry data streams, and provide that information to: (i) a host OS, (ii) other applications, and/or (iii) other devices in platform 200. In collecting data, sensor hub 207 may include General-Purpose Input/Output (GPIOs) that provide Inter-Integrated Circuit (I²C), Improved I²C (I³C), Serial Peripheral Interface (SPI), Enhanced SPI (eSPI), and/or serial interfaces to receive data from sensors (e.g., sensors 110, camera 210, peripherals 214, etc.). Sensor hub 207 may include a low-power core configured to execute small neural networks and specific applications, such as contextual awareness and other enhancements.

High-performance AI device 208 is a significantly more powerful processing device than sensor hub 207, and it may be designed to execute multiple complex AI algorithms and models concurrently (e.g., Natural Language Processing, speech recognition, speech-to-text transcription, video processing, gesture recognition, user engagement determinations, etc.). For example, high-performance AI device 208 may include a Neural Processing Unit (NPU), Tensor Processing Unit (TPU), Neural Network Processor (NNP), or Intelligence Processing Unit (IPU), and it may be designed specifically for AI and Machine Learning (ML), which speeds up the processing of AI/ML tasks while also freeing processor(s) 101 to perform other tasks. Using such capabilities, one or more devices of heterogenous computing platform 200 (e.g., GPU 204, aDSP 206, sensor hub 207, high-performance AI device 208, VPU 211, etc.) may be configured to execute one or more AI model(s), simulation(s), and/or inference(s).

Security device 212 may include one or more specialized security components, such as a dedicated security processor, a Trusted Platform Module (TPM), a TRUSTZONE device, a PLUTON processor, or the like. In various implementations, security device 212 may be used to perform cryptography operations (e.g., generation of key pairs, validation of digital certificates, etc.) and/or it may serve as a hardware RoT for heterogenous computing platform 200 and/or IHS 100.

Modem/wireless controller 213 may be designed to enable wired and wireless communications in any suitable frequency band (e.g., BLUETOOTH or "BT," WiFi, CDMA, 5G, satellite, etc.), subject to AI-powered optimizations/customizations for improved speeds, reliability, and/or coverage.

Peripherals 214 may include any device coupled to heterogenous computing platform 200 (e.g., sensors 110) through mechanisms other than PCIe interfaces 205. In some cases, peripherals 214 may include interfaces to integrated devices (e.g., built-in microphones, speakers, and/or cameras), wired devices (e.g., external microphones, speakers, and/or cameras, Head-Mounted Devices/Displays or "HMDs," printers, displays, etc.), and/or wireless devices (e.g., wireless audio headsets, etc.) coupled to IHS 100.

In some implementations, EC 109 may be integrated into heterogenous computing platform 200 of IHS 100. In other implementations EC 109 may be external to the heterogenous computing platform 200 (i.e., EC 109 residing in its own semiconductor package) but coupled to integrated bridge 216 via an interface (e.g., enhanced SPI or "eSPI"), thus supporting the EC's ability to access the SoC's interconnect fabric 203, including sensor hub 207 and sensor(s) 110. Through this connectivity supported by interconnect fabric 203, EC 109 may directly access and/or operate most or all of devices 201-216, 110 of heterogenous computing platform 200.

Figure 3:
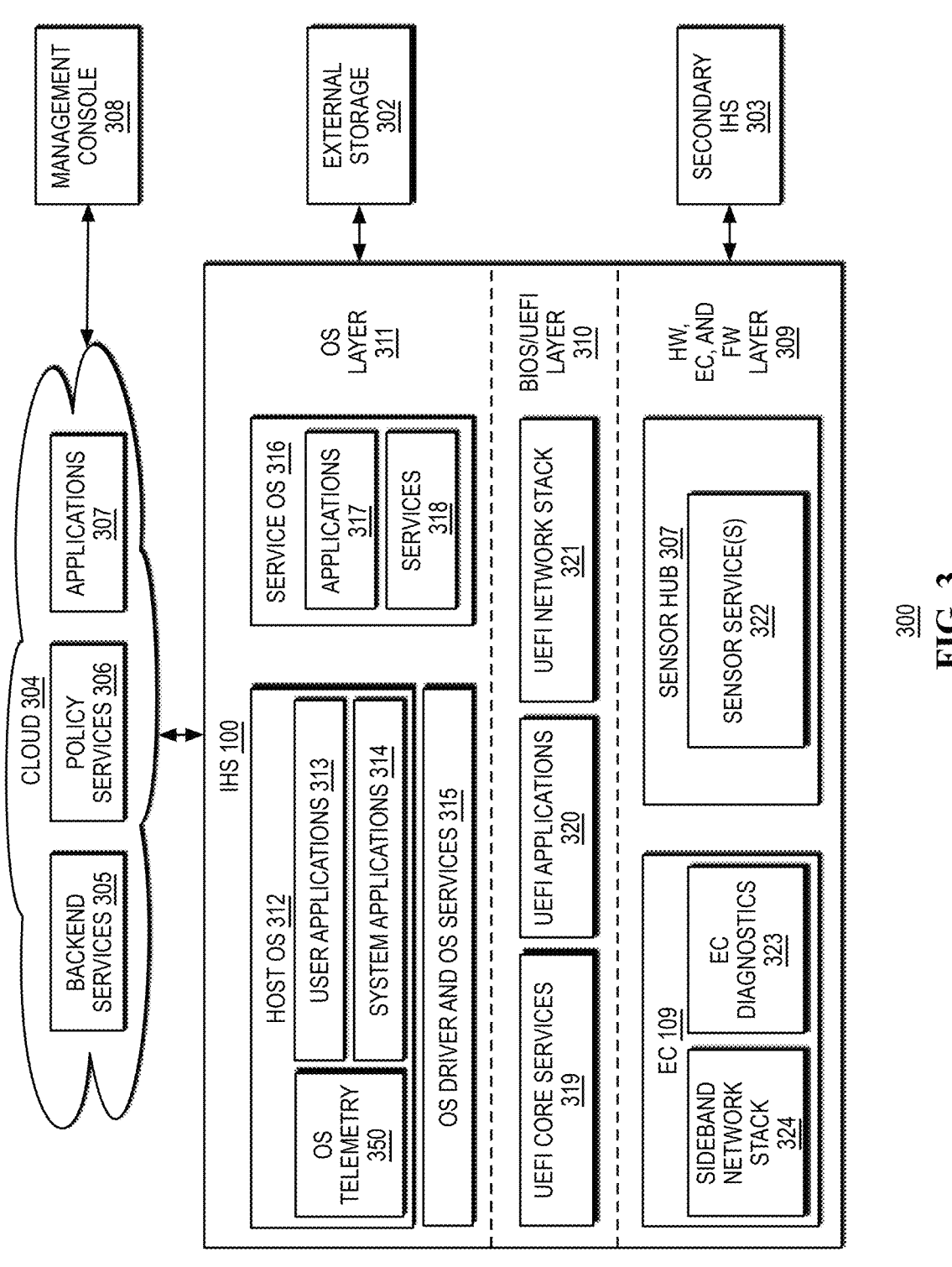
FIG. 3 is a diagram illustrating an example of a software and firmware architecture of an IHS, according to some embodiments.

FIG. 3 is a diagram illustrating an example of architecture 300 usable with IHS 100. Particularly, architecture 300 includes IHS 100 (e.g., implementing aspects of IHS 100 and/or platform 200) coupled to storage device 302 (e.g., NVMe, SSD, etc.), secondary or companion IHS 303 (e.g., a smart phone, a laptop, etc.), and cloud or remote services 304. Cloud 304 may include backend or remote services 305, policy services 306, and web applications 307. In some cases, components of cloud 304 may be accessible to IHS 100 and/or secondary IHS 303, and configurable via ITDM management console 308.

IHS 100 may include hardware/EC/firmware layer 309, BIOS/UEFI layer 310, and OS layer 311. Specifically, OS layer 311 includes host OS 312 executed by host processor(s) 101. A variety of software applications may operate within OS 312, where these applications may include user applications 313 and system applications 314. Applications that operate within the OS 312 may also include one or more telemetry applications 350.

OS layer 311 may also include various drivers and other core OS operations, such as the operation of a kernel. As described, various components of heterogenous computing platform 200 may independently run their own OS, such as a Real-Time OS (RTOS) run by an SoC.

Within IHS 100, RTOSs executed by individual components of the heterogenous computing platform 200 are deemed distinct from service OS 316, which includes its own applications 317 and services 318. Hardware device drivers 315 used by host OS 312 and/or by service OSs 316 may support the operation of IHS 100 hardware.

BIOS/UEFI layer 310 may include pre-OS core services 319, pre-OS applications 320, and pre-OS network stack 321 that are each executed by BIOS/UEFI 107. BIOS core services 319 may include operations for identifying and validating the detected hardware components of IHS 100. BIOS applications 320 may include operations for interfacing with certain hardware devices of IHS 100, in particular user input devices. The network stack 321 of BIOS 310 may be utilized during initialization of IHS 100 in support of validation procedures, such as in retrieving reference signatures corresponding to authentic firmware instructions for hardware components of IHS 100.

As illustrated, IHS 100 also includes a hardware/EC/firmware layer 309 with EC 109 and sensor hub 207. As described above, EC 109 may implement a variety of procedures for management of individual hardware of IHS 100. EC 109 is configured to execute one or more sensor services 323 that interface with sensor hub 207 in implementing various operations, such response to user-presence determination by the sensor hub 207 that is acted upon by EC 109 in initiation heightened security protocols. Moreover, EC 109 may interface with some or all individual hardware components/systems of IHS 100 via sideband management channels that are separate from inline communication channels used by host processor(s) 101 and SoCs.

As described above, sensor hub 207 may receive inputs from some or all sensors 110A-N of an IHS 100. Sensor hub 207 may implement a variety of sensor service(s) 322 for communicating with and collecting data from sensors 110A-N. In some embodiments, sensor hub 207 may implement shock detection procedures that may incorporate inputs from inertial and other sensors 110A-N of IHS 100. Shock detection procedures may detect shocks experienced by IHS 100 and may characterize and assess possible damage to IHS 100.

Over the many years since the introduction of the first IBM PC in the 1980s, the complexity of BIOS settings has increased significantly. Users now face a myriad of BIOS setup settings, making navigation and locating specific settings of interest challenging. This complexity can be particularly daunting for less technically inclined users, who may find the process time-consuming and frustrating. The need to identify the correct UI page and sift through numerous settings adds to the difficulty, leading to a suboptimal user experience.

Current mechanisms for managing BIOS settings involve navigating through multiple UI pages to find the desired setting. These approaches require users to have a level of technical knowledge and patience, as they manually search through various pages and settings. The lack of an intuitive search mechanism exacerbates the problem, making the process difficult for users to quickly locate and modify specific BIOS settings. Additionally, the static nature of the current BIOS setup structure does not adapt to user preferences or frequently accessed settings, further complicating the user experience.

To address these, and other concerns, systems and methods described herein introduce a smart search functionality within the setup of BIOS 107. In various embodiments, these systems and methods may leverage Natural Language Processing (NLP) to allow users to input search queries in natural language, simplifying the process of finding specific BIOS settings.

Natural Language Processing (NLP) is a field of Artificial Intelligence (AI) that focuses on the interaction between computers and humans through natural language. It involves algorithms and models that enable computers to understand, interpret, and generate human language in a way that is meaningful and useful.

As used herein, the term "AI Model" refers to a computational framework designed to perform tasks that typically require human intelligence. These tasks may include learning from data, recognizing patterns, making decisions, and predicting outcomes. An AI model may be built using algorithms and mathematical structures that process input data to produce meaningful outputs. The model may be trained on a dataset to learn the relationships and patterns within the data, enabling it to make accurate predictions or decisions when presented with new, unseen data. AI models may be implemented in various forms, such as neural networks, decision trees, support vector machines, and more, each suited to different types of tasks and data structures.

In various embodiments, a locally executed AI model may process the natural language input, converting the input into tokens and translating these tokens into relevant BIOS settings.

Search results may be presented as hyperlinks, enabling users to navigate directly to the desired settings. Furthermore, BIOS 107 may keep a history of frequently accessed settings and it may refine search results based on user behavior, enhancing the overall user experience.

Figure 4:
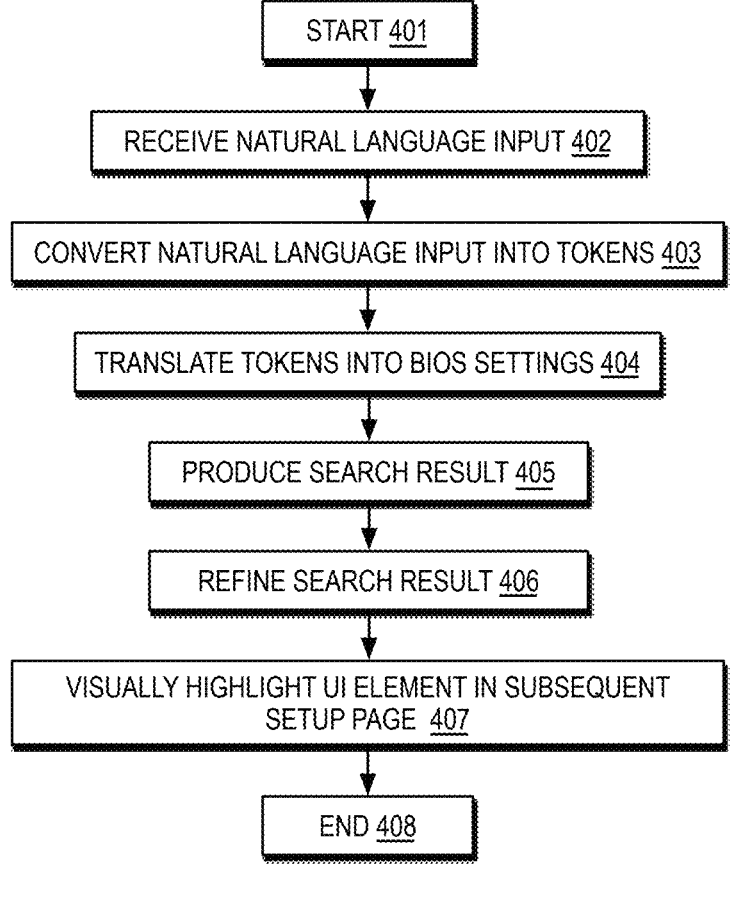
FIG. 4 is a diagram illustrating an example of a method for smart search of Basic Input/Output System (BIOS) settings, according to some embodiments.

FIG. 4 is a diagram illustrating an example of method 400 for smart search of BIOS settings. In some embodiments, method 400 may be performed, at least in part, by BIOS 107.

Method 400 begins at 401. At 402, BIOS 107 receives a Natural Language (NL) input from a user via a search field on a BIOS setup page in a pre-boot environment. This NL input may be in the form of text or voice commands, for example, allowing users to interact with the BIOS setup using natural language queries.

At 403, the received NL input may be processed by an Artificial Intelligence (AI) model. The AI model may include a front-end component (e.g., tinyBERT) that tokenizes the NL input, breaking it down into smaller, manageable units such as words or phrases. This tokenization process may involve breaking down the natural language input into smaller, manageable units such as words or phrases. The tokens may then be analyzed and interpreted by the AI model to understand the context and intent behind the user's input.

Specifically, at 404, tokens generated by the front-end component may be fed into a transformer within the AI model. The transformer may translate these tokens into relevant BIOS settings by mapping them to specific configuration options within the BIOS setup. This translation process may leverage the AI model's understanding of the relationships between the tokens and the BIOS settings, allowing it to accurately identify and present the settings that are most relevant to the user's query.

At 405, the identified BIOS settings may be made available to the user as part of search results. These search results may be presented in an intuitive and user-friendly manner, as a list of hyperlinks. Each hyperlink may correspond to a specific BIOS setting or BIOS setup page, enabling users to navigate directly to the desired setting without having to sift through multiple UI pages.

Search results may be presented in an order from most to least searched BIOS settings, enhancing the user experience by prioritizing frequently accessed settings. Each hyperlink in the search result may be retrieved from a catalog of hyperlinks created based, at least in part, upon an Internal Form Representation (IFR) binary file. Each entry in the catalog of hyperlinks may include a Human Interface Infrastructure (HII) handle, a Formsetguid, a FormID, a QuestionID, and a title string.

In 406, method 400 may further refine the search results based on user behavior. The AI model may keep a history of frequently accessed settings and sort the search results in an order from the most to least searched BIOS settings. This dynamic sorting may enhance the overall user experience by prioritizing the settings that are most relevant to the user.

Finally, at step 407, method 400 may visually distinguish or highlight a User Interface (UI) element on another setup page produced in response to the user selecting a hyperlink. This visual distinction helps users easily identify and interact with the specific BIOS setting they are interested in, further simplifying the BIOS configuration process, reducing the complexity and time required to locate and modify the desired settings. In some cases, only the UI element (among other UI elements) may be available for selection by the user (e.g., not grayed out) in the subsequent page.

As such, method 400 may leverage AI and NLP technologies to provide smart searches within the BIOS setup, significantly improving the user experience by making it easier to find and modify BIOS settings. The integration of AI and NLP technologies simplifies the process, making the method accessible even to users who may not be technically inclined. The method enhances the overall user experience by providing a more intuitive and straightforward approach to configuring BIOS settings.

Figure 5:
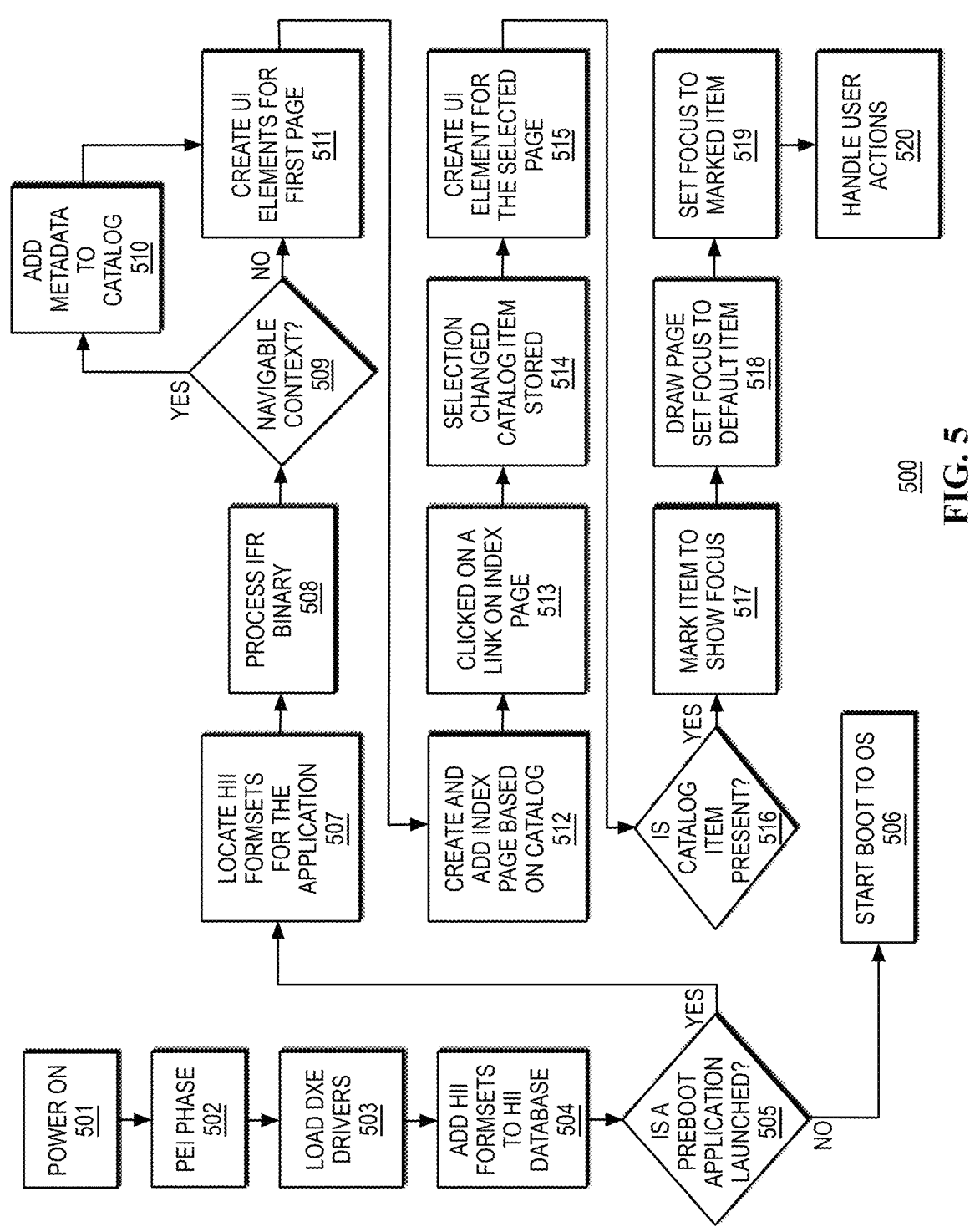
FIG. 5 is a diagram illustrating an example of a method for creating Internal Form Representation (IFR) binaries with hyperlinks, according to some embodiments.

FIG. 5 is a diagram illustrating an example of method 500 for creating Internal Form Representation (IFR) binaries with hyperlinks. In various embodiments, this method enhances the user experience by dynamically generating hyperlinks that allow users to navigate directly to specific BIOS settings.

Method 500 begins at step 501, where IHS 100 powers on. This may involve the activation of IHS 100 from a powered-off state. During this phase, the system's hardware components, such as the processor, memory, and storage devices, are initialized and brought to a ready state. The power-on process is crucial for setting up the environment required for the subsequent boot sequence and BIOS operations.

At 502, the boot sequence may enter the Pre-EFI Initialization (PEI) phase. The PEI phase is an early stage in the UEFI boot process, where the system firmware initializes the essential hardware components and prepares the system for the Driver Execution Environment (DXE) phase. During the PEI phase, the firmware performs tasks such as memory initialization, processor configuration, and chipset setup. This phase ensures that the critical hardware components are correctly configured and operational before proceeding to the next stage of the boot sequence.

At 503, the boot sequence may load the DXE drivers. The DXE phase is a part of the UEFI boot process where the system firmware loads and executes various drivers required for the IHS 100's hardware components. These drivers, known as DXE drivers, provide the necessary interfaces and functionalities for the hardware devices, enabling them to communicate and operate correctly within IHS 100. The loading of DXE drivers ensures that all hardware components are fully functional and ready for use by host OS 312 and other software layers.

At 504, method 500 may add HII formsets to an HII database. The HII database is a structured repository that stores the formsets used to create the BIOS setup user interface. Each formset contains the definitions and configurations for various BIOS settings and options. Adding HII Formsets to the HII database involves processing the Internal Form Representation (IFR) binary files, which are compiled representations of the Visual Forms Representation (VFR) language used to define the BIOS setup forms. This step ensures that the BIOS setup interface is populated with the necessary formsets, allowing users to access and modify the BIOS settings through a structured and user-friendly interface.

At 505, method 500 may determine if a preboot application is launched. If not, control passes to host OS 312 at 506. Otherwise, at 507, method 500 may locate HII formsets for the preboot application. The HII formsets may contain the definitions and configurations for various BIOS settings and options, which are essential for the preboot application's functionality. Locating HII formsets may include searching the HII database for the specific formsets required by the preboot application.

Method 500 may identify the relevant formsets based on the application's requirements and retrieve them from the HII database. This process may ensure that the preboot application has access to the correct configuration data and user interface elements, allowing it to function correctly and provide the necessary options to the user.

Method 500 may then process the IFR binary file at 508. The IFR binary file may be a compiled representation of the Visual Forms Representation (VFR) language used to define the BIOS setup forms. This file contains the necessary information to create the user interface elements for the BIOS setup. The IFR binary file may serve as a foundational data structure from which the BIOS setup forms are generated, ensuring that the user interface accurately reflects the defined settings and options.

Method 500 may interpret the IFR opcodes to create a hierarchical list of FORM_BROWSER_STATEMENT structures. These structures are defined by the UEFI specification and represent the individual elements of the BIOS setup forms. The hierarchical list, referred to as an FBStatementList, may be processed to create the graphical user interface (GUI) elements for the BIOS setup. The interpretation of IFR opcodes may involve parsing the binary file to extract the necessary information for constructing the user interface, ensuring that each element is accurately represented and functional within the BIOS setup environment.

At 509, method 500 may determine whether UI elements or content is navigable to—that is, whether they can navigate to it. If so, at 510, method 500 may build a catalog of links as the FBStatementList is being created. Each element in the catalog may include information such as the formset's HII handle, Formsetguid, FormID, QuestionID, and a title string to show on the index page. This catalog may serve as a dynamic index of the BIOS setup elements, allowing for efficient navigation. The catalog of links may be dynamically generated based on the current structure of the BIOS setup, ensuring that the catalog of links 503 remains up-to-date and accurately reflects the available settings and options.

At 511, method 500 may process the catalog to create UI elements for an index or first page with hyperlinks. These UI elements may correspond to the individual BIOS settings.

At 512, method 500 may create the index page using the UI elements, which may include hyperlinks that allow users to navigate directly to the desired BIOS settings. The index page may be dynamically generated based on the catalog, ensuring that the index page accurately reflects the current BIOS setup structure. The creation of the index page with hyperlinks may involve organizing the catalog entries into a user-friendly format, enabling users to quickly and easily access the settings they need.

At 513, when a user clicks on a hyperlink, method 500 may store the selected catalog element and changes the selected formset. This selection change may trigger a page update, and the FORM_BROWSER_STATEMENTs for the new formset may be processed to create the corresponding GUI elements. A callback for link activation may ensure that the user is seamlessly directed to the appropriate BIOS setup page, with the relevant settings and options displayed for easy modification.

At 514, the user's selection may modify a stored catalog item. In response at 515, method 500 may create a UI element for the selected setup page. At 516, if the catalog element is present, control passes to 517.

At 517, method 500 marks the UI element associated with the active catalog element as the "to be shown control." This ensures that the specific BIOS setting the user is interested in is highlighted and easily accessible. In some cases, the "to be shown control" designation may indicate that this UI element should be the focal point when the page is rendered, making it easier for the user to identify and interact with the desired setting. When the page is drawn at 518, if the UI element is not grayed out, the focus is set to the UI element at 519.

If the UI element is not grayed out, it may indicate that it is available for interaction, the focus is set to the UI element at 519. This means that the UI element becomes the active control on the page, ready for user input. Setting the focus to the UI element ensures that the user can immediately begin interacting with the specific BIOS setting without having to navigate through other elements on the page.

If the UI element is grayed out, it may not be currently available for interaction, and method 500 may take an alternative action. For example, instead of setting the focus to the grayed-out element, the page may be scrolled so that the element is visible to the user. This ensures that the user can still see the specific BIOS setting they are interested in, even if it is not currently selectable. Moreover, by making the element visible, the system provides the user with a clear indication of where the desired setting is located, reducing the time and effort required to find it. At 520, method 500 may handle any user initiated actions.

As such, FIG. 5 illustrates a method that leverages the IFR binary file to dynamically create hyperlinks for BIOS settings, significantly improving the user experience by making it easier to find and modify BIOS settings. The integration of this method within the BIOS setup process enhances the overall usability and accessibility of the BIOS IFR binaries with hyperlinks, according to some embodiments.

In sum, by receiving an NL input from a user via a search field on a BIOS setup page in a pre-boot environment, systems and methods described herein simplify the process of finding specific BIOS settings. This approach eliminates the need for users to navigate through multiple UI pages, thereby reducing the complexity and time required to locate desired settings.

Processing the NL input through an AI model configured to identify one or more BIOS settings relevant to the NL input allows for a more intuitive and user-friendly interaction. The AI model may be configured to interpret natural language queries, making it accessible even to users who may not be technically inclined. This enhances the overall user experience by providing a more efficient and straight-forward method for configuring BIOS 107.

To illustrate a use-case, consider a situation user wants to optimize their IHS for better graphics performance. The user accesses the BIOS setup page in a pre-boot environment and sees a search field prominently displayed at the top of the page. Instead of navigating through multiple pages and submenus, the user decides to use the NL search functionality.

The user types in the search field, "How can I improve my graphics performance?" The system receives this NL input and processes it through an AI model configured to understand and interpret natural language queries. The AI model tokenizes the input into manageable units such as words and phrases, and then translates these tokens into relevant BIOS settings.

The AI model identifies several BIOS settings related to graphics performance. These settings may include options for adjusting the GPU clock speed, enabling or disabling integrated graphics, and configuring memory allocation for the GPU. Additionally, the AI model recognizes that CPU performance may also impact graphics performance, so it includes relevant CPU settings in the search results. These CPU settings may include options for adjusting the CPU clock speed, enabling or disabling CPU turbo mode, and configuring power management settings.

Search results may be presented to the user, at least in part, as a list of hyperlinks, each corresponding to a specific BIOS setting. These results may be sorted in an order from most to least relevant based on the user's query and previous search history. The user sees hyperlinks for "GPU Clock Speed," "Integrated Graphics," "Memory Allocation for GPU," "CPU Clock Speed," "CPU Turbo Mode," and "Power Management Settings."

If the user clicks on the "GPU Clock Speed" hyperlink, they may be immediately taken to the BIOS page where this setting can be adjusted. The system then highlights the "GPU Clock Speed" option, making it easy for the user to locate and modify the setting. After adjusting the GPU clock speed, the user returns to the search results page and clicks on the "CPU Turbo Mode" hyperlink. Again, the system navigates directly to the relevant BIOS page and highlights the "CPU Turbo Mode" option.

Consider another use case where a user wants to enhance the security settings of ISH 100. The user types in the search field, "How can I improve my system security?" In response, the AI model may identify several BIOS settings related to system security. For example, these settings may include options for enabling Secure Boot, configuring Trusted Platform Module (TPM) settings, and setting up BIOS passwords. Additionally, the AI model may recognize that certain CPU settings can also impact system security (e.g., enabling virtualization-based security (VBS) and configuring Intel Software Guard Extensions (SGX)), and it may The search results are presented to the user as a list of hyperlinks, each corresponding to a specific BIOS setting. The results may be sorted in an order from most to least relevant based on the user's query and previous search history. The user may see hyperlinks for "Secure Boot," "TPM Configuration," "BIOS Password," "Virtualization-Based Security," and "Intel SGX."

If user clicks on the "Secure Boot" hyperlink and they may be immediately taken to the BIOS page where this setting can be enabled. Method 500 may highlight the "Secure Boot" option, making it easy for the user to locate and modify the setting. After enabling Secure Boot, the user may return to the search results page and click on the "TPM Configuration" hyperlink. Again, method 500 navigate directly to the relevant BIOS page and highlights the "TPM Configuration" option These non-limiting use-cases demonstrate how the integration of NLP and AI in the BIOS setup can significantly improve the user experience. By allowing users to input natural language queries and receive relevant search results, systems and methods described herein simplify the process of finding and modifying BIOS settings.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises"

and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are 10 described herein with regard to specific embodiments are not intended to be construed as a critical, required, or essential feature or element of any or all the claims.

The invention claimed is:

1. An Information Handling System (IHS), comprising:
a processor; and
a memory coupled to the processor, the memory having program instructions stored thereon that, upon execution by the processor, cause the IHS to:
receive a Natural Language (NL) input from a user via a search field on a Basic Input/Output System (BIOS) setup page in a pre-boot environment;
process the NL input through an Artificial Intelligence (AI) model configured to identify one or more BIOS settings relevant to the NL input; and
make the identified BIOS settings available to the user as part of a search result that comprises one or more hyperlinks retrieved from a catalog of hyperlinks created based, at least in part, upon an Internal Form Representation (IFR) binary file.

2. The IHS of claim 1, wherein the AI model comprises a front-end configured to turn the NL input into tokens.

3. The IHS of claim 2, wherein the AI model comprises a transformer coupled to the front-end, the transformer configured to translate the tokens into the identified BIOS settings.

4. The IHS of claim 1, wherein the NL input involves two or more IHS components, and wherein the identified BIOS settings relate to each of the two or more IHS components.

5. The IHS of claim 1, wherein the program instructions, upon execution, cause the IHS to present the search result in an order from most to least searched BIOS settings.

6. The IHS of claim 1, wherein each entry in the catalog of hyperlinks comprises a plurality of Human Interface Infrastructure (HII) variables, further comprising a handle, a Formsetguid, a FormID, a QuestionID, and a title string.

7. The IHS of claim 1, wherein the program instructions, upon execution, cause the IHS to visually distinguish a User Interface (UI) element on another setup page produced in response to the user selecting a hyperlink based, at least in part, upon the catalog of hyperlinks.

8. A method performed by a Basic Input/Output System (BIOS) of an Information Handling System (IHS), the method comprising:

receiving a Natural Language (NL) input from a user via a search field on a Basic Input/Output System (BIOS) setup page in a pre-boot environment;

processing the NL input through an Artificial Intelligence (AI) model configured to identify one or more BIOS settings relevant to the NL input; and making the identified BIOS settings available to the user as part of a search result that comprises one or more hyperlinks retrieved from a catalog of hyperlinks created based, at least in part, upon an Internal Form Representation (IFR) binary file.

9. The method of claim 8, wherein the NL input comprises a text input.

10. The method of claim 8, wherein the NL input comprises an audio input.

11. A hardware memory device having program instructions stored thereon that, upon execution by a processor of an Information Handling System (IHS), cause the IHS to:

receive a Natural Language (NL) input from a user via a search field on a Basic Input/Output System (BIOS) setup page in a pre-boot environment;

process the NL input through an Artificial Intelligence (AI) model configured to identify one or more BIOS settings relevant to the NL input; and make the identified BIOS settings available to the user as part of a search result that comprises one or more hyperlinks retrieved from a catalog of hyperlinks created based, at least in part, upon an Internal Form Representation (IFR) binary file.

12. The hardware memory device of claim 11, wherein the processor is part of a heterogeneous computing platform selected from the group consisting of: a System-On-Chip (SoC), a Field-Programmable Gate Array (FPGA), and an Application-Specific Integrated Circuit (ASIC).

13. The hardware memory device of claim 12, wherein the heterogeneous computing platform comprises a Reduced Instruction Set Computer (RISC) processor coupled to an interconnect.

14. The hardware memory device of claim 13, wherein the interconnect comprises at least one of: an Advanced Micro-controller Bus Architecture (AMBA) bus, a QuickPath Interconnect (QPI) bus, or a HyperTransport (HT) bus.

* * * * *